June 11, 1963  J. B. ADAMS  3,093,423
TRACTION ATTACHMENTS FOR TRACTORS AND TRUCKS
Filed April 29, 1960  3 Sheets-Sheet 1
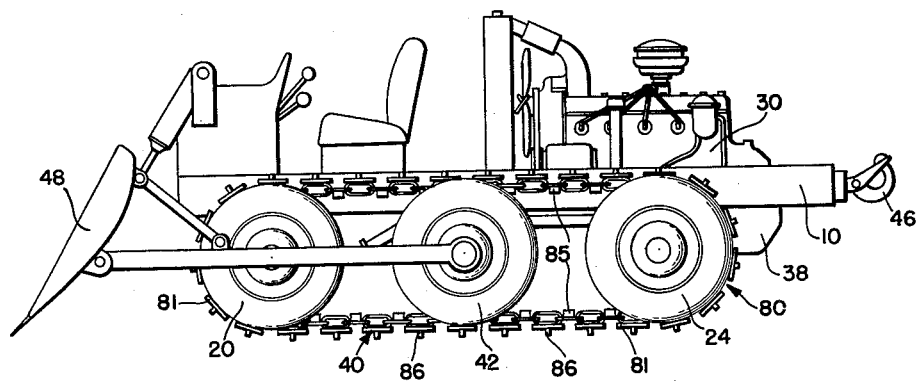
FIG.__1
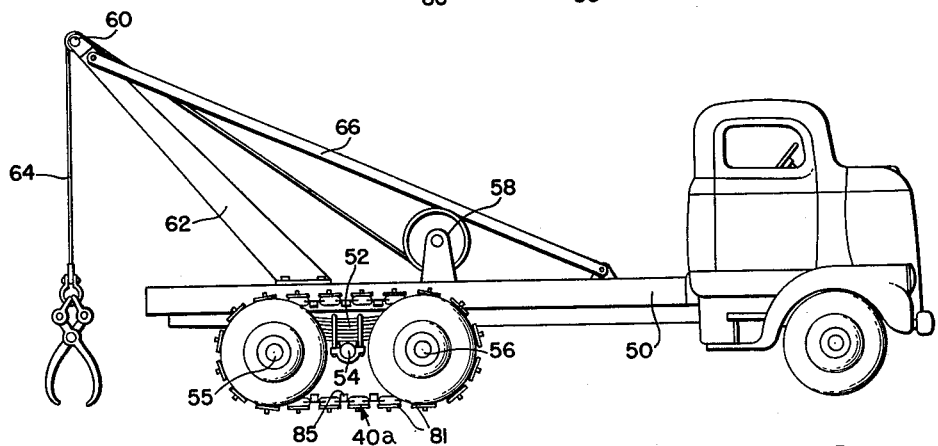
FIG.__2
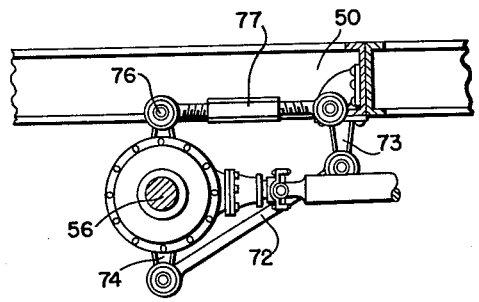
FIG.__3
JACK B. ADAMS
INVENTOR.
BY Smith & Tuck June 11, 1963   J. B. ADAMS   3,093,423
TRACTION ATTACHMENTS FOR TRACTORS AND TRUCKS
Filed April 29, 1960   3 Sheets-Sheet 2

JACK B. ADAMS
INVENTOR.

BY Smith & Tuck

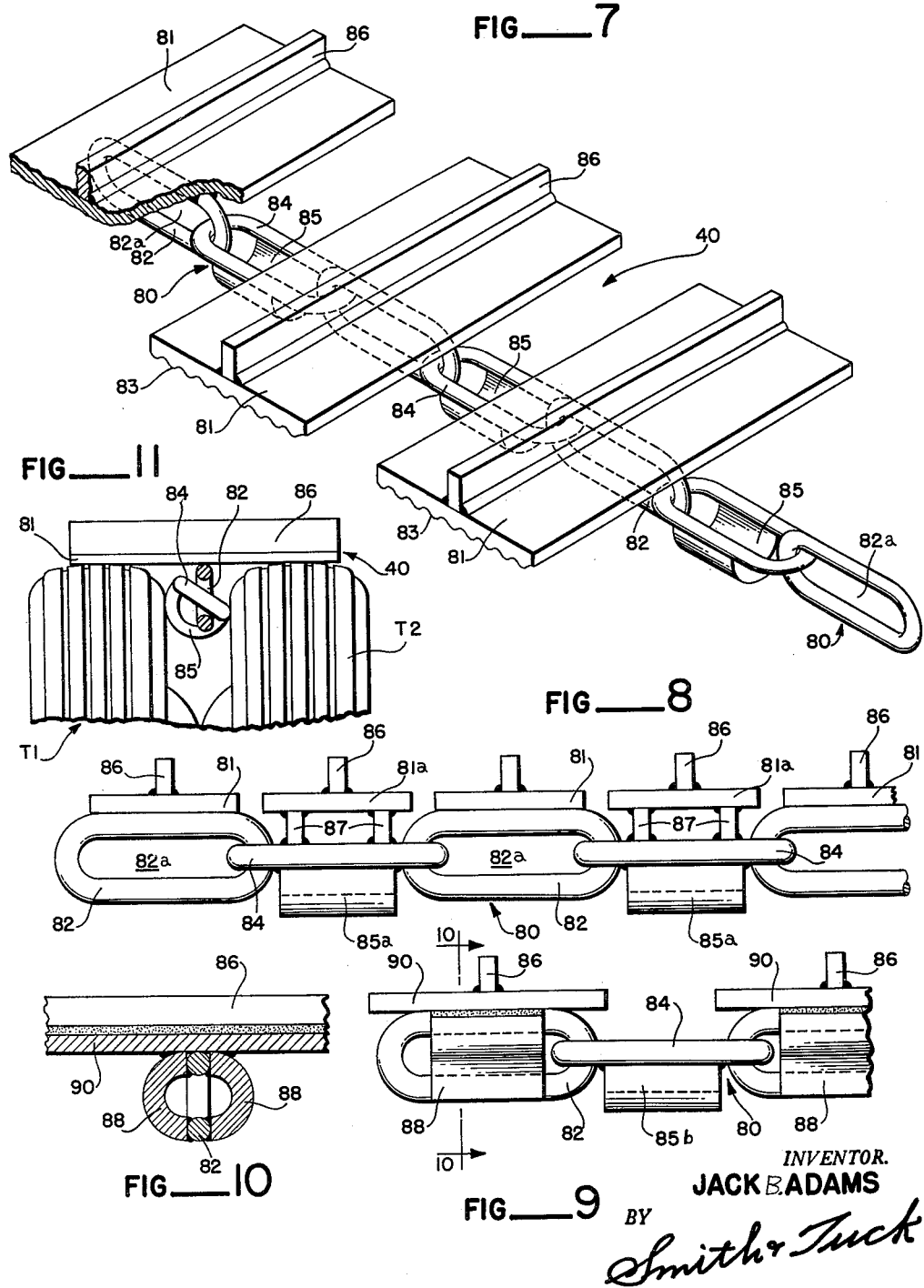

United States Patent Office 3,093,423
Patented June 11, 1963

3,093,423
TRACTION ATTACHMENTS FOR TRACTORS
AND TRUCKS
Jack B. Adams, Eastsound, Wash.
(Rte. 8, Box 446, Olympia, Wash.)
Filed Apr. 29, 1960, Ser. No. 25,672
6 Claims. (Cl. 305—56)

My present invention relates to rubber tired tractor and truck equipment and more specifically to tread traction means which are employed in cooperation with a plurality of dual tire equipped wheels on each side of the vehicle and which permits a wide range of adaptability of the vehicle to unusual operational conditions.

There are many unusual operations where the usual trucks and tractors currently produced cannot be very effectively used. As an example of such use we have selective logging, where only certain types of trees are removed. Another example is in clearing wooded areas for park use where a portion of the trees are in conformity to the State or Federal park plans. Experience has indicated that the preferred equipment for this type of service should be built up to a degree from existing truck equipment without the attendant expense of specially designed and factory built equipment which would be very expensive where only a small quantity would be produced.

The principal object of my present invention therefore is to provide means which, when combined with standardized wheeled vehicles of general utility types, will produce vehicles suitable for the unusual conditions encountered in selective or small scale logging operations.

A further object of this invention is to provide a flexible crawler or track-laying type of tread which can be quickly applied to a plurality of spaced wheels on each side of a wheeled vehicle giving it the added tractive capabilities required only for a part of their use.

A further object of this invention is to provide a belt type tread for use on dual tired wheels which, while relatively light in weight can be easily and quickly put in place or removed.

A further object of this invention is to provide a belt type tread track, formed on an elongated chain having loose joints between the links, adapted to be positioned between dual tires and to be additionally provided with guiding means to prevent damage to the sidewalls and the tread portions of the tires employed.

Further objects, advantages and capabilities will be apparent from the description and disclosure in the drawings or may be comprehended or are inherent in the device.

FIGURE 1 illustrates a tractor type vehicle adaptable for use in limited road making and capable of hauling logs from the woods without the necessity of building roads to the woods.

FIGURE 2 is a loading vehicle capable of limited movement of logs and providing means for loading the logs onto logging trucks which normally could operate only on graded road.

FIGURE 3 illustrates one form of take-up means employed to place proper tension on the belt type treads and to make it possible to remove the treads conveniently when desirable.

FIGURE 7 is a fragmentary perspective view, partly in section, illustrating the manner in which the supporting plates of my belt tread are positioned and driven by chain drive means.

FIGURE 8 is a fragmentary view showing, in a modified arrangement, several of the pressure plates and the manner in which they are welded to the supporting elongated link chain.

FIGURE 9 is a fragmentary view, in elevation, showing a modification over FIGURE 8.

FIGURE 10 is a cross-sectional view, in fragmentary form, taken along the line 10—10 of FIGURE 9.

FIGURE 11 is a fragmentary view similar to FIGURE 6 but showing the pressure plate as moved to one side of the supporting tires which occurs when making turns with the vehicle.

Figure 4:
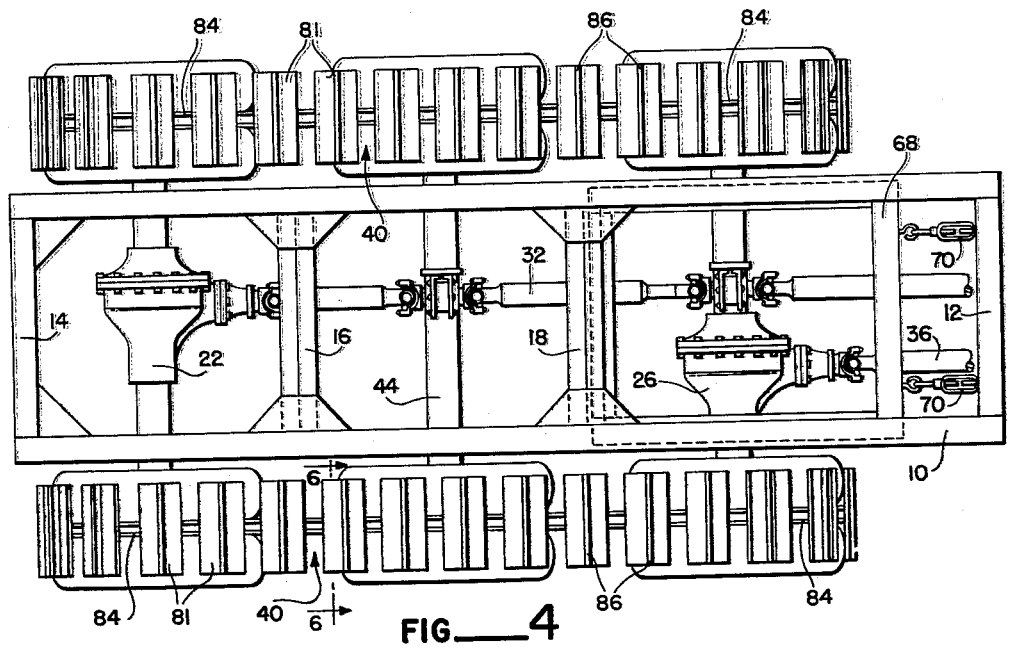
FIGURE 4 is a top plan view of the equipment shown in FIGURE 1 but with the controls and engine, disposed above the frame, removed for clarity of illustration of the driving and supporting means.

These drawings illustrate a typical example of vehicles to which my traction attachments are suitable. Referring to these drawings, throughout which like reference characters indicate like parts the numeral 10 designates the framework of a tractor employing the principles of this present invention. The frame 10 follows conventional principles of automotive construction and is tied together transversely with a plurality of transverse members 12 and 14 disposed at each end of the frame with additional transverse members as 16 and 18 intermediate the ends. For use as a tractor it is desirable to have the wheel base of a reasonable length to insure stability and provide adequate drive contact area. This may be achieved by having the front drive wheels 20 with their corresponding driving axle 22 and rear drive wheels 24 with their corresponding driving axle 26 forming a coacting group of adequately spaced apart tandem drive wheels on each side of the vehicle. Wheels 20 and 24 are typical of the multiple drive wheels used on vehicles to which my track belt is adaptable. These two driving axles 22 and 26 are coupled to the same prime mover which is indicated by the internal combustion engine 30. In the form shown the respective drive shafts 32 and 36 are coupled to a gear box 38 with proper differential means, all of which structure is in common usage and specifically forms no part of this present invention, it being only necessary to provide a minimum of two driving axles and to have them adequately spaced apart. To additionally support the belt tread 40 one or more idler wheels 42 with their associated transverse axles 44 preferably are provided. As this vehicle is used largely for dragging logs to a point where they can be loaded on trucks, a suitable towing hook is provided at 46. A bulldozer blade 48 has been shown at the front end of the vehicle and this may be arranged in any convenient manner, the exact means employed to position and operate the blade being beyond the scope of this present invention.

In FIGURE 2 a dual axle truck is indicated as a further example of the use of my invention. This truck has the frame 50 to which springs 52 are secured on a pivot 54 so that the transverse truck axles 55 and 56 can swing about pivot 54 to accommodate themselves to the terrain. This vehicle is arranged with a power actuated drum 58 and is provided with an A-frame having two main members 62 which are spaced apart at the level of truck frame 50 and secured thereto. The A-frame members are joined together at their upper ends where a sheave 60 is employed to guide and serve cable 64. Two supporting members 66 are provided, again with their lower ends secured to the truck frame 50 and their upper ends secured to the A-frame members 62. On each side of the truck, axles 55 and 56, both of which are usually but not necessarily driven by the truck motor, have mounted on them dual pneumatic tired wheels so as to support and position track belt 40a. In both instances, in the case of the tractor and the truck, it is necessary to have take-up means capable of considerable adjustment so that proper tension can be placed upon belts 40 and also so that they may actually be slackened sufficiently so that the belt 40 may be removed from the dual tired wheels.

In FIGURE 4 a slidable frame 68 is provided which is properly guided within frame 10. A plurality of turnbuckles 70 is employed to position frame 68 against the tension imposed by belt 40 as it is being driven. In the form of belts indicated in FIGURE 2 a take-up means is shown in FIGURE 3 consisting of one of the axles as 56 which is pivotably supported by link 72, one end of which is secured to frame 50 by means of pedestal 73, and near the end is pivotably secured to housing 74, which may be either the differential and gear housing or in some cases the axle housing itself. Diametrically opposed to the pivot for link 72 is a second pivot 76 to which a suitably sized turnbuckle 77 is pivotably connected. The opposite end of turnbuckle 77 is pivoted to frame 50.

Figure 5:
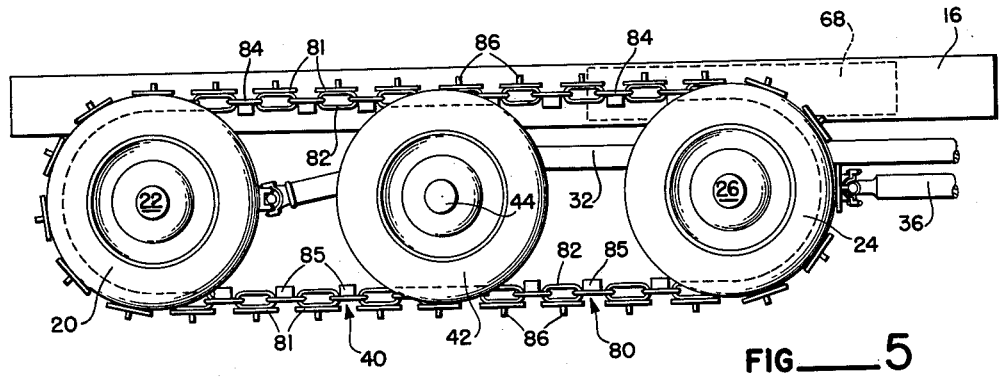
FIGURE 5 is a side view of FIGURE 4.
Figure 6:
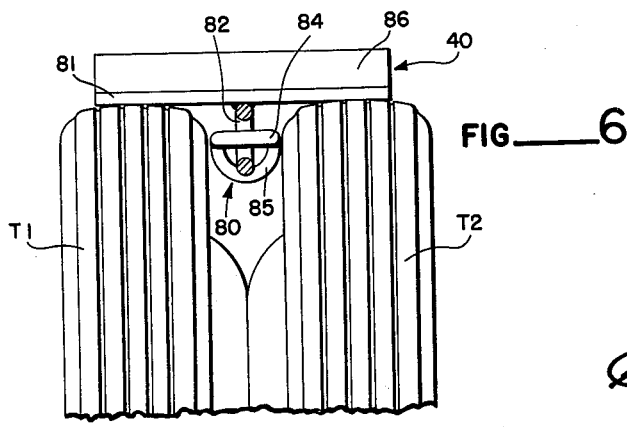
FIGURE 6 is a fragmentary cross-sectional view taken along the line 6—6 of FIGURE 4.

Both types of this logging equipment employ the same type of removable treads 40 or 40a. These treads require a group of coacting wheels, having dual tires, on each side of the vehicle. The details of structure of the tread are probably best shown in FIGURES 6, 7, 8, 9, 10 and 11 in which it will be noted that an elongated link chain 80 is employed. The elongated links 8 have a length substantially 2½ times the overall width of said links and provide proportionally a much greater length of interior open space which makes it possible to secure relatively long guide members 85 than could be employed with a chain of standard proportions and still provide two-way freedom of movement of the links forming the chain tension members. A chain of this type provides the loose linkage required to prevent bending of the tread on turns and side hills. This is a form of chain that has been developed for dredging operations and found to be particularly adaptable to my present use because the service on dredges and on track laying vehicles is very similar in that they must work in all sorts of gravel, sand, dirt, mud and the like. The height, weight and bulk are kept to a minimum. The elongated links present a desirable spacing of the loose joints required and act much like rods having eyes on their opposite ends. One form of belt is shown in FIGURE 7 and is also illustrated in FIGURES 5 and 6. With this arrangement the transversely disposed tread plates 81 are employed and are normally welded to the edge of the alternate links 82 disposed at right angles to the plane of plate 81 and under the plates providing a tread plate assembly. The underside of plates 81 is grooved or otherwise configured at 83 to provide a maximum frictional engagement with the treads of tires T1 and T2.

The connecting links 84 between the various plates 81 are coupling means which have a further function of providing guidance for the belt 40. Semi-cylindrical guide members 85 are welded to links 84, or any other form of connecting means used. These guide members have a form as though a piece of thin-walled tubing or pipe were cut lengthwise along a diameter. In FIGURE 6 this structure is shown in cross-section and this figure further illustrates the manner in which the bearing plates are employed. It will be noted that each link 84 and its semi-cylindrical guide member 85 provide a strong unit, which has rounded edges at all points. As the guide members are disposed between tires T1 and T2 and disposed inwardly of the path of travel of plates 81 the plates are definitely positioned transversely of the tires. It should be noted that the length of the plates is appreciably less than the overall width of the assembled tires and wheels. This is a desirable relationship as the tread plates 81 and any grousers or cleats 86 are so positioned by the tires that they cannot damage trees which the tires might contact during a logging operation.

In FIGURE 11 has been illustrated the change in position of plate 81 which occurs when the vehicle is making a turn. Plate 81 has been moved to the right as viewed and causes a partial revolution of link 84 and guide 85 about their longitudinal axis. Under such usage it is very desirable that these parts are smooth so as not to cut or damage the sidewalls of the tires. For use in dry areas it is desirable to coat these parts with a protective coating of plastic or rubber based material.

The form of the tension member 80 is relatively immaterial as the only consideration is that there be no appreciable stretch and the member must have a pivoted joining which gives a pivoted joint in the plane of the track movement, so the track can pass around the end wheels and leave also a pivot transversely to permit controlled transverse movement of the affected portion of the track during turns, on hillsides and the like. As will be noted in FIGURES 7, 8 and 9 the joint between the links has an access of clearance as the diameter of the link stock is substantially one half of the space 82a inside the link. This proportion makes a free or loose joint and gives work space to build up the ends of the links, by welding, when they become worn.

In FIGURE 8 a modified form of belt structure is shown in which there is a track bearing plate 81a secured by means of spacers to each connecting link of the chain and between plates 81. This requires a reduced width in the plate 81a but gives an opportunity for placing the plates quite close together, desirable in certain types of terrain and soil. This form of chain employs the semi-cylindrical guide means 85a which of course functions as previously described for guides 85. However, to have a plate 81a secured to a horizontally disposed link 84 and on the same plane as plate 81, spacer members 87 are required. These parts are normally all welded together to make a very sturdy arrangement.

A further variation of the guide means is shown in FIGURES 9 and 10 in which two semi-cylindrical tubular members 88 are welded, one on each side of the vertical link 82 to which the tread plate 90 is secured. The horizontal link 84 conforms to the showing of FIGURE 6 in that the guide member 85b is of the same structure. It is to be noted that if the semi-tubular members 85b and 88 are all of the same size stock, which is desirable, then the overall width which would be disposed transversely of the tires, after the showing of FIGURE 6, will be greatest up against the bearing plates 90 with a reduced width for the transverse guide member 85b at a lower level after the showing of FIGURE 9. This is desirable since it conforms generally to the space available between tires T1 and T2, thus giving the best form of guidance.

It is believed that it will be clearly apparent from the above description and the disclosure in the drawings that the invention comprehends a novel construction of traction attachments for tractors and trucks.

Having thus disclosed my invention, I claim:

1. A belt traction tread attachment for wheeled vehicles having multi-axle drive with dual wheels thereon comprising:
   (1) a continuous link chain capable of being disposed between said dual wheels, said chain consisting solely of straight closed oval metal ring links, adjacent links of said chain being interlinked to one another and positioned at right angles with respect to one another providing alternate links disposed in a common plane;
   (2) transverse tread plates fixedly secured to links of said chain, said tread plates being dimensioned to extend from the tread surface of one of said dual wheels to the tread surface of the other of said dual wheels; and
   (3) semi-circular guide means fixedly secured to links of said chain and directed to extend inwardly into the space between said dual wheels.

2. A belt traction tread attachment for wheeled vehicles having multi-axle drive with dual wheels thereon comprising:

(1) a continuous link chain capable of being disposed between said dual wheels, said chain consisting solely of straight closed oval metal ring links, adjacent links of said chain being interlinked to one another and positioned at right angles with respect to one another providing alternate links disposed in a common plane, some of said links being vertical links and the remainder of said links being horizontal links;

(2) transverse tread plates fixedly secured to said vertical links, said tread plates being dimensioned to extend from the tread surface of one of said dual wheels to the tread surface of the other of said dual wheels; and (3) semi-circular guide means fixedly secured to said horizontal links and directed to extend inwardly into the space between said dual wheels.

3. A belt traction tread attachment as recited in claim 2 in which said transverse tread plates have outstanding cleats fixedly secured thereto.

4. A belt traction tread attachment as recited in claim 3 in which said tread plates are the only elements secured to said vertical links and said guide means are the only elements secured to said horizontal links.

5. A belt traction tread attachment as recited in claim 2 in which transverse tread plates are secured to said horizontal links by means of spacers to bring the bearing face thereof to the same plane as the tread plates secured to said vertical links.

6. A belt traction tread attachment as recited in claim 2 in which semi-circular guide members are also secured to each side of said vertical links.

References Cited in the file of this patent

UNITED STATES PATENTS

| | | |
|---|---|---|
| 1,587,262 | White | June 1, 1926 |
| 2,110,587 | Bennett et al. | Mar. 8, 1938 |
| 2,124,708 | Peter | July 26, 1938 |
| 2,821,443 | Galanot | Jan. 28, 1958 |
| 2,829,013 | Patrick | Apr. 1, 1958 |

FOREIGN PATENTS

| | | |
|---|---|---|
| 328,889 | Italy | Aug. 22, 1935 |
| 400,693 | Italy | Dec. 21, 1942 |